United States Patent [19]

Purdy et al.

[11] 3,707,902

[45] Jan. 2, 1973

[54] PHOTOTYPESETTING EQUIPMENT

[76] Inventors: Haydn V. Purdy; Ronald C. McIntosh, both c/o Harris, Purdy, McIntosh, 269 Abbeydale Rd., Wembley, Middlesex, England

[22] Filed: Aug. 10, 1970

[21] Appl. No.: 62,532

[52] U.S. Cl. ....................... 95/4.5
[51] Int. Cl. ....................... B41b 13/00
[58] Field of Search ....................... 95/4.5

[56] References Cited

UNITED STATES PATENTS 3,162,105 12/1964 Moyroud ....................... 95/4.5
3,464,331 9/1969 Tiefenthal ....................... 95/4.5

*Primary Examiner*—John M. Horan
*Attorney*—Marechal, Biebel, French & Bugg

[57] ABSTRACT

Characters on a movable character vehicle are identified by a plurality of character readers (flash lamps and TV camera tubes) spaced around the vehicle, and character signals are stored in short term storage registers for each reader. A character imput, such as a tape or the like, is read in advance and compared with the characters in the short term storate registers for coincidence. When coincidence occurs, a comparator cancels the stored signal in the coinciding register and transfers the character to an address store register capable of storing one or more characters, where it is retained until called for by the phototypesetter. The apparatus speeds-up "read-off" time by reading the imput sequence in advance of the output by one or more characters, and by identifying a chosen character and predicting its arrival time.

5 Claims, 2 Drawing Figures

PHOTOTYPESETTING EQUIPMENT

Figures 1, 2:
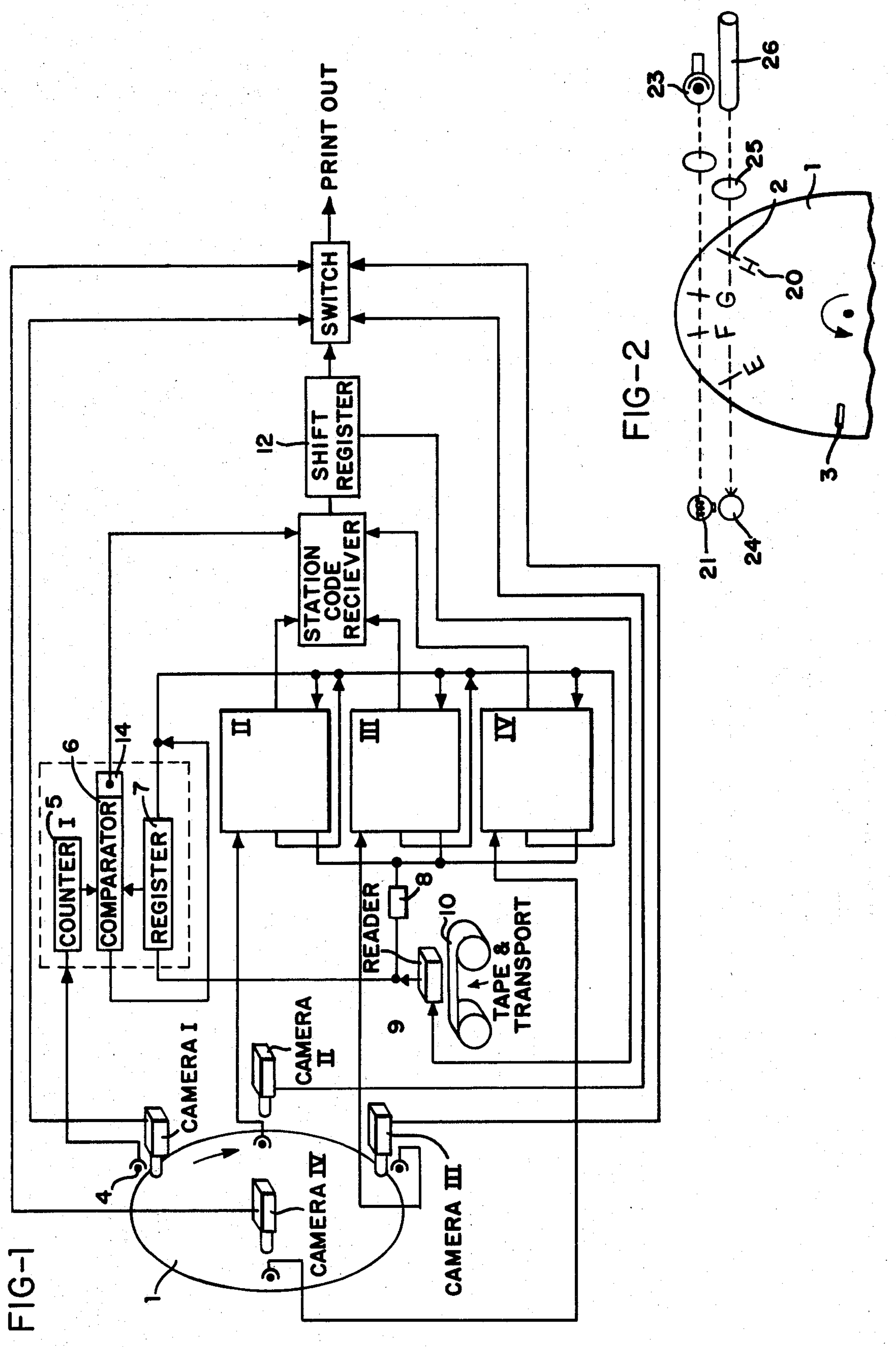

This invention relates to photo-typesetting of the kind in which the fonts are printed on a transparent disc, drum, or other vehicle capable of high speed movement past a reading position at which selected typographic characters are photonically read in turn for composition.

Since the characters are in an unchanging sequence and reach the reading position at different times in a repetitive time cycle, it is clear that a demand for a particular character at an arbitrary time may have to wait anything up to a complete time cycle for the type face to reach the reading position.

On average, half the time cycle is lost per character read out.

The object of the present invention is to speed up the 'read-off' time.

This is done by providing a number of reading positions spaced around the or each type font sequence on the high speed vehicle. By suitable means, the nearest available reading position in the direction of movement of the vehicle to a selected character is selected for reading off the character.

The waiting time is now reduced to $1/x$, for example, where $x$ is the number of reading positions. It is therefore proposed to provide short-term character storage individual to each reading position. This has the result that the reading positions become busied for the period in which a character is stored in its associated storage device, and the selection of the reading position to be used for a required character is now a function both of the relative positions, and of the idle and busy conditions of the reading positions.

In addition, the order in which stored characters are transferred to print-out has also to be controlled.

The protection to which the invention is entitled is postulated in the accompanying statement of claim.

In a typical phototypesetter, a spinning disc is employed which bears a circular alphabet array, any character of which can be illuminated by a short duration flash. It is a limitation on speed that the master array presents its characters most efficiently when recycling its alphabet continuously, whereas the output requirement, such as a word string, is essentially an irregular sampling of the master.

This irregularity slows the effective output, particularly in those machines incorporating a fixed relationship between input string and output string. It is a purpose of the present invention to overcome this deficiency by providing a character storage means and a plurality of character selection stations.

It is also a feature of typical phototypesettings that a high intensity flash has to be routed through a variable optical path so as to provide the desired sequence of images directly on to a photographic medium. It is a purpose of the present invention to provide the output image by indirect means, namely a cathode ray tube, with subsequent advantages in mechanical arrangement and image placement.

It is further disadvantage of existing machines that the requirement of the photosensitive film to be exposed by a relatively high intensity flash necessarily limits the speed of the moving character array past the light source, as it is well known that a bright discharge persists longer than a weak discharge, that is, it increases image smear. The present invention employs a television camera tube to receive the flashed image, such tubes having a higher sensitivity and requiring less light than conventional photographic emulsions, and thus permitting a shorter access and/or less smear. As the output is electrical and not optical it becomes possible to connect several mechanically separated generators to a single display device, making available large alphabets which are commonly required in phototypesetting.

It is proposed to provide a device having a finite array or number of arrays of photographic characters and/or symbols arranged to be presented continuously in known and fixed sequence to a plurality of reading stations.

Each such station is provided with a means (which may be common to all) for identifying a chosen character and predicting its arrival time. Each such station consists essentially of an image storage medium, for instance a television camera tube, capable of electrically transmitting its stored image on demand to a cathode ray tube display able to image successive characters, parts of characters, or lines of characters on to a photographic material.

The input to this system is taken to be a string of codes, representing characters of successive words, and accepted from a record medium such as paper tape, magnetic tape, or the like, or from an output buffer of a computer or similar device.

The output of the system is a photographic product, e.g. film or paper, consisting of suitably arranged typographic images.

The input sequence of the desired characters is read in advance of the output by one or more characters. The purpose of reading in advance is to select the stations at which successive characters are to be read according to their current approach relationships within the fixed order array, thus optimizing the speed of their availability at the output.

For the purpose of this invention a television camera tube is taken to be a device which incorporates a light sensitive plane area, or target, capable of accepting a projected visible image and storing the presence of such image, which may be fleeting, in an electrical form, which image may be scanned by an electron beam usually in a symmetrical pattern so as to produce a varying electrical output corresponding to the original image.

In a preferred version four such camera tubes are arranged around the periphery of a rotatable disc, each provided with a means of identifying chosen characters, by character count. Each is further provided with a xenon flash tube, optically in line with its target, such optical path being intersected by the moving array of photographic character images arranged around the disc circumference. Each character presents itself to all four cameras in turn, per cycle.

In operation a desired character can be identified by each of the four reading stations in turn, except any station which is disqualified by reason of its retention of a stored image from a previous cycle.

The disc has 100 characters and 100 associated markers each of which is counted by a photocell and lamp combination at each station. The first character has its marker broadened so as to be specially identified by each photocell and by its recognition resetting each counter to zero allows any character to be identified by a numerical count from zero in well-known manner. Each counting register is associated with an input register adapted to receive the 'count' number allocated to a character required and to compare it with the counter reading as it precesses and to provide a signal upon coincidence between them.

On reading an input to the system; for example a character code from a tape; the appropriate character count number is placed in each of the four registers. When the required character reaches the first available 'read' station, that one of the four pairs of registers will achieve coincidence.

This causes:

1. The flashtube associated with the register achieving coincidence to project the desired character upon its target;
1. A new input to be read, which initiates a repetition of the cycle, except that the image storing target and its associated register remains disqualified from accepting a new input so long as its stored image has not been transferred to the print-out cathode ray tube.

The next input, being read into each of the three remaining reading stations also causes a coincidence signal to occur in one or another, which station is in its turn disqualified, and so on. Cycling can continue until all reading stations are disqualified, whereupon reading of new inputs is inhibited. The identities of the stations at which the coincidences occur are recorded in turn in a 'storage address' register, which controls the order in which the characters stored in the television camera tubes are printed out.

The storage address register comprises four code storage positions each consisting of a pair of flipflops arranged as a uni-directional serial register in which input codes precess along until adjacent a previous code or to the end position in the register. It is not an obligation for the input to be synchronous with the output. The identity codes for the four 'read' positions are binary 00, 01, 10, 11 which serve to identify each of the four television camera tubes. Inputs occur at the instant when character storage is achieved at any television camera tube, and outputs are controlled by the demand signals of the associated cathode ray tube phototypesetter.

We may now consider an appropriate output medium, such as a cathode ray tube phototypesetter. One example is the Linotron 505 of Linotype Paul Ltd., in which a sequence of individual raster lines on a cathode ray tube is projected on to a photographic emulsion. The machine normally reconstitutes a pulse train generated from a flying spot scanner into actinic images projected from a cathode ray tube on to a photographic emulsion. In the present application it is made, instead, to accept a like pulse train derived from one or other of the four television camera tubes, sampled in the order dictated by the storage address register.

Alternatively, the invention may be applied to the control of any output cathode ray tube the face of which is arranged to be projected on to a photographic emulsion. To meet the sizing requirements of typography, such an output device, in combination with the character generator already described, will have twin rasters synchronously deflected, one raster being the image scanning raster (tv camera tube) the other being the image-projecting raster (cathode ray tube), the relationship in size between the two being adjusted by well-known means.

The invention will be clearly understood from the following description of a preferred embodiment shown in the accompanying drawings in which FIG. 1 is a schematic circuit diagram of photo-typecomposing equipment incorporating the invention, while FIG. 2. shows a type wheel and type-face reader and position counter equipment.

Referring first to FIG. 2, the transparent spinning disc 1 carries the circular array of characters 20, and a circular array of radial character position bars 2. Associated with the character array at each of four spaced positions around the disc only one of which is shown, is provided on opposite sides of the disc a flash lamp 24 and a lens 25 together with a TV camera tube 26.

Associated with the array of bars 2 at each position are a lamp 21 on one side of the disc and a light-cell and counter assembly 23 for sending an electrical pulse per bar to an associated pulse counter (not shown).

Referring now to FIG. 1, the type disc 1 carries the ring of typographic characters A, B, — to be read in the manner shown in FIG. 2, and the ring of radial character position bars 2 including a home position bar 3. At each of four arbitrarily spaced 'read' positions 00,01,10, and 11 there are provided as well as the read-out equipment shown in FIG. 2, position bar detectors and pulse senders 4 each connected to a respective pulse counter 5 arranged to count from the home position bar 3, so that at any time each counter 5 is aware of the relative position of the type disc.

Associated with each counter 5 is a comparator 6 and a character number store 7 into which is inserted the position number on the disc 1 of the next typographic character required, which number is sent from a character code translator 8 into which successive character codes are read from a programme tape 10, by a tape reader 9 in well-known manner.

When a number is inserted in the input registers 7, which are not already busy in the manner described below, the first character counter 5 (whose input register 1 contains the said number) which reaches that number causes its comparator 6 to operate and to send out the identity (00,01,10,11) of the corresponding 'read' position on the disc 1 to the Address Store Register 12, which can store in turn up to four addresses, thus recording the whereabouts of the next four characters to be printed out when required. At the same time, the operated comparator 6 sends a number-cancel signal to all the input registers 7.

The read-out equipment at each 'read' position comprises the flash tube at one side of the character circle on the disc and a television camera aligned with the flash tube on the other side of the character circle, so that operation of the flash tube when a character is between the flash tube and the camera will record the character on the camera screen.

The Register 12 is a buffer store receiving identities from the comparators 6 and transmitting identities to select the respective picture storage tubes from which successive characters are to be printed.

Any known form of page print-out equipment can be used incorporating a print-out cathode ray tube. A four-way switch is provided to connect the print-out tube to the scan output of any one of the camera tubes.

The last of the four code identity store positions in the register 12 is associated with switching equipment of well-known type for signalling to one or other of the four camera tubes according as the binary code stored is 00,01,10, or 11.

According to the operational description, already given, a character number is inserted in the free number stores 7 and one of the associated comparators 6 operates.

Immediately, the corresponding flash tube records the selected character on the disc on the screen of the camera tube individual to the 'read' position in question. At the same time the operated comparator sends a 'number-cancel' signal to all the number stores 7 to cancel the number of the character just stored in readiness to receive the next character code from the translator 8.

Further an identity code transmitter 14 individual to the successful comparator sends its code into the serial register 12 along which it travels until it reaches the previously-inserted code, or the far end of the register, if empty.

The print-out operates autonomously. Initially, the print-out equipment will signal both to the tape reader 9 and to the register 12 that print-out can start. The register 12 is now triggered to signal via its camera tube selector to the camera tube corresponding to the first 'position' code received from a comparator.

The selected camera tube now scans its screen and transmits its raster signal to the print-out CRT.

At the end of its scan, the raster generator equipment signals to the register 12 via a channel common to all the camera tubes to initiate raster signal transmission from the camera tube identified by the leading code in the register. In this way a succession of characters are printed corresponding to the succession of character codes read from the tape, but they are printed from a random succession of camera tubes determined solely by a selection process the purpose of which is to reduce waiting time between the printing of successive characters.

It is clear that more than one disc and/or more than one circular character array per disc can be incorporated into such a system.

When the register 12 is full, it signals to the tape reader 9 to stop reading until the signal is removed at the time that the next camera tube code is transmitted from the register.

For simplicity the 'read' positions have been distributed around a single disc. It is in fact better from a manufacturing point of view to have several independently driven discs with a single 'read' position each.

Variations in speed can occur even with similar drive motors and can set up a random spacing of the individual 'read' positions.

With independently driven discs each with a single 'read' position, some other form of selection of the individual 'read' positions for storage may be practicable, even a fixed cycle being a possibility, perhaps in association with the well-known letter frequency arrangement of the characters around the discs.

What we claim is:

1. Phototypesetting equipment comprising
   a continuously moving character carrier means having a font of type characters thereon;
   marker means associated with said carrier means to mark the position of each character;
   a plurality of camera stations located along the path of motion of said characters;
   each camera station having access to the entire font and each comprising a photo-electric storage means, a flash unit for creating a light image of a selected character on said storage means, and means for transmitting electrical signals representative of the store image;
   means for selecting a sequence of characters to make up lines of text;
   distributor means responsive to the status of each of said storage means and to said character selecting means for distributing the character selection information to the respective camera stations;
   switching means receiving the signals from each of said camera stations and operative to pass the signals in predetermined order;
   and control means responsive to said selecting means and to each of said camera stations and controlling said switching means to maintain the order to the signals passed by said switching means corresponding to the order of character selection.

2. Equipment as in claim 1 wherein each said camera station includes pulse generating means responsive to said marker means and a counter driven by said pulse generating means to count the flow of characters past the associated storage means;
   said character selecting means having simultaneous outputs to each of said camera stations whereby a selected character will be recorded at the camera station past which that character moves next.

3. Equipment as defined in claim 2, wherein each camera station includes as part of said distributor means a comparator connected to the associated counter and to said selecting means;
   said comparator operating to actuate the flash unit of the associated camera station to record the selected character and also to send a unique code to said control means identifying the camera station at which the character is stored.

4. Equipment as defined in claim 3, wherein said control means includes a register receiving the codes from said camera stations in the order in which the characters are selected and stored temporarily at said camera stations, said register being connected to operate said switching means in the correct sequence to pass said character signals in the selected order from the several camera stations.

5. Equipment as defined in claim 1 wherein said character carrier means is a rotating font member common to all the camera stations.

* * * * *